Patented Apr. 2, 1929.

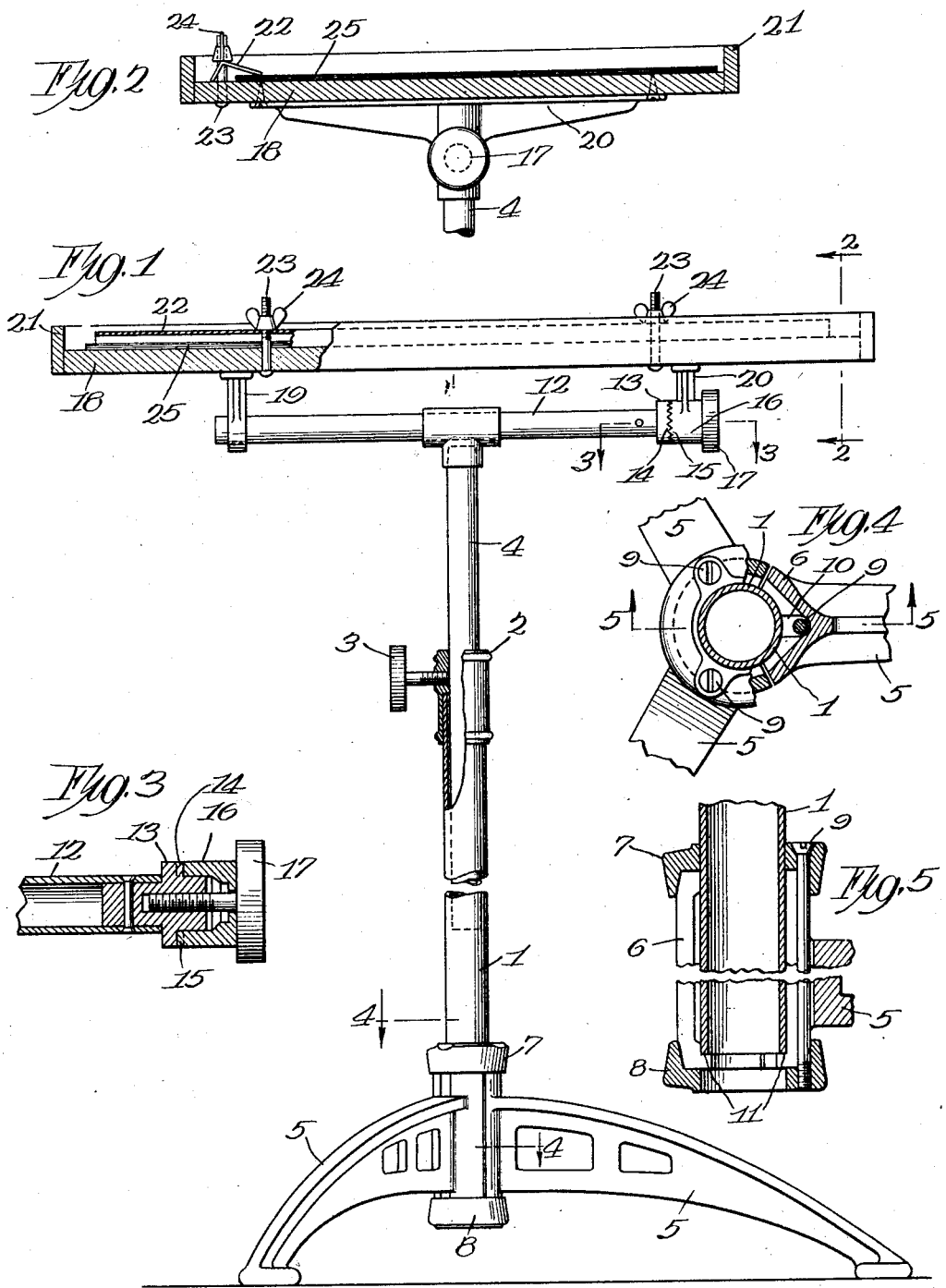

1,707,505

UNITED STATES PATENT OFFICE.

JOSEPH W. BISHOP, OF MUSKEGON, MICHIGAN, ASSIGNOR TO THE BRUNSWICK-BALKE-COLLENDER COMPANY, OF WILMINGTON, DELAWARE, A CORPORATION OF DELAWARE.

SCORE TABLE.

Application filed August 14, 1925. Serial No. 50,152.

This invention relates to a novel and improved table particularly adapted for use in connection with games such as bowling, billiards and the like and the principle object is to provide a table which may be cheaply and efficiently made, readily assembled, which shall consist of a small number of elements and which shall be rugged in character and simple in operation.

The novel features of my invention will become more apparent from a consideration of the drawing and referring thereto;

Fig. 1 is an elevation of my table, parts thereof being shown in section to better illustrate the invention.

Fig. 2 is a section taken on the line 2—2 of Fig. 1.

Fig. 3 is a section taken on the line 3—3 of Fig. 1.

Fig. 4 is a section taken on the line 4—4 of Fig. 1.

Fig. 5 is a section taken on the line 5—5 of Fig. 4.

My table consists substantially of the support 1, which is preferably made of the tubular form illustrated and which is provided at is upper end with a collar 2 rigid thereon. Threaded in the collar 2 is the set screw 3 by means of which the standard 4 which is slidably mounted in the support 1 may be adjustably secured in position.

The support 1 is carried by a plurality of legs 5, in this embodiment 3 of these legs being shown. I prefer to make the legs detachable and for that purpose I provide each leg with a segmental bearing 6, which contacts with the periphery of the support 1. The bearing 6 of the legs are received between two clamping members 7 and 8 which are secured together by means of a plurality of bolts 9. I have shown these bolts as corresponding in number to the number of legs and have shown each bearing 6 as recessed at 10 to permit the passage of a bolt 9 therethrough. Each bearing is provided with a shoulder 11 upon which may be placed the bottom edge of the support 1. By this means not only can the legs be separated one from another, but the support may be readily placed in and removed from the base formed by the legs when they are joined together.

Extending transversely of the standard 4 and rigidly secured thereto is a member 12 preferably formed of hollow tubing as are also the support and standard. This material results in great rigidity and is easily manipulated. Secured to one end of the transverse member 12 is a plug 13 terminating in a serrated edge 14 engaging with a correspondingly serrated edge 15 on a sleeve 16. The serrated edges are kept in engagement by means of a screw 17 threaded into the plug 13. Supported upon the transverse member 12 is the top 18 which is provided with a plurality of depending brackets 19 and 20. In this embodiment I have shown two of these brackets, the bracket 19 being slidably and rotatably mounted on the transverse member 12 and the bracket 20 being integral with the sleeve 16. By this arrangement the table top may be tipped about the transverse member 12 to adjust it to any desired angle. This adjustment is performed by merely loosening the screws 17 when the table may be moved bodily along the transverse member 12 sufficiently to release the serrated surfaces 14 and 15. The top may then be tipped to the desired position and secured there by tightening the screw 17. The table top is provided with a clamp for holding paper thereon and is also provided with shoulders 21 on all four sides of the top to prevent paper falling therefrom. The clamp which I refer to use comprises a strip 22 of material preferably of metal and of the angular form shown. This strip is comparatively thin and because of its thinness and because of its angular shape it has a great deal of resiliency. A plurality of bolts 23 are secured to the top 18 and pass through the strip 22, suitable wing nuts or the like 24 engaging the strip 22 to hold it and the paper 25 on the top.

In operation any number of sheets of paper or card board upon which a score is to be kept may be inserted beneath the clamping means exemplified by the strip 22, where they will be securely held in position. At the same time one or more of these sheets may be readily taken out without disturbing the rest and the clamping means may be adjusted at any time. The top may be readily tipped as described above so as to occupy any angle to the horizontal which may be found convenient and the entire top may be placed at the desired height and secured there by means of the set screw 3. When not in use the support 1 may be lifted from the base if desired and in fact the base itself may be dismantled and the various parts thereof stored away.

I am aware that changes in the form, construction and arrangement of parts may be made without departing from the spirit and without sacrificing the advantages of the invention and I reserve the right to make all such changes as fairly fall within the scope of the following claim.

I claim:

A table comprising a standard, a hollow tube on said standard, a table top having a plurality of brackets one of which is mounted to rotate on and to slide longitudinally on said tube, a plug secured in one end of said tube and having a serrated edge, the other of said brackets being mounted on said plug and having a serrated portion engageable with the serrated edge of said plug and a screw threaded into said plug having a head engageable with the last mentioned bracket for forcing said serrated portion into locking relation with said serrated edge.

JOSEPH W. BISHOP.